United States Patent
Stinson et al.

(10) Patent No.: US 8,418,056 B2
(45) Date of Patent: Apr. 9, 2013

(54) METHOD AND APPARATUS FOR CHECKOUT TRANSITION IN AN E-COMMERCE APPLICATION

(75) Inventors: Charles Laurence Stinson, Mississauga (CA); Sang-Heun Kim, Mississauga (CA)

(73) Assignee: Research In Motion Limited, Waterloo (CA)

( * ) Notice: Subject to any disclaimer, the term of this patent is extended or adjusted under 35 U.S.C. 154(b) by 878 days.

(21) Appl. No.: 12/016,476

(22) Filed: Jan. 18, 2008

(65) Prior Publication Data

US 2009/0187820 A1 Jul. 23, 2009

(51) Int. Cl.
*G06F 17/24* (2006.01)
*G06F 17/25* (2006.01)

(52) U.S. Cl. .......................... 715/238; 715/248

(58) Field of Classification Search ................... 715/238
See application file for complete search history.

(56) References Cited

U.S. PATENT DOCUMENTS

| | | | |
|---|---|---|---|
| 6,970,602 B1 | 11/2005 | Smith et al. | |
| 6,970,918 B2 | 11/2005 | Brown et al. | |
| 7,171,616 B1* | 1/2007 | Berstis | 715/205 |
| 7,197,296 B2* | 3/2007 | Little et al. | 455/410 |
| 7,213,072 B2 | 5/2007 | Coulombe et al. | |
| 7,788,577 B2* | 8/2010 | Lueck | 715/239 |
| 7,904,487 B2* | 3/2011 | Ghatare | 707/803 |
| 2002/0133569 A1* | 9/2002 | Huang et al. | 709/219 |
| 2003/0061386 A1* | 3/2003 | Brown et al. | 709/246 |
| 2003/0115365 A1 | 6/2003 | Lindsey | |
| 2003/0135560 A1 | 7/2003 | Bodin | |
| 2003/0220881 A1* | 11/2003 | Pirhonen et al. | 705/53 |
| 2004/0166834 A1* | 8/2004 | Omar et al. | 455/414.1 |
| 2004/0221063 A1 | 11/2004 | Mogul | |
| 2004/0230536 A1* | 11/2004 | Fung et al. | 705/64 |
| 2007/0250711 A1* | 10/2007 | Storey | 713/168 |
| 2007/0255852 A1* | 11/2007 | McBride et al. | 709/246 |
| 2007/0263841 A1 | 11/2007 | Li | |

OTHER PUBLICATIONS

Siau et al., "Building Customer Trust in Mobile Commerce", ACM, 2003, pp. 91-94.*
Uruchurtu et al, "Usability Evaluation of OpenWeb Transcoding", MobileHCI, 2009, pp. 1-4.*

(Continued)

*Primary Examiner* — Doug Hutton, Jr.
*Assistant Examiner* — James Debrow
(74) *Attorney, Agent, or Firm* — Bennett Jones LLP

(57) ABSTRACT

A method and apparatus for transcoding content or elements of a webpage received at a client device, for example, a mobile communication device or other type of networked device. The apparatus includes a transcoding engine which is configured to transcode webpage content during a secure end-to-end connection between a client device and a website without the use of a proxy. According to an embodiment, the transcoding engine resides on the client, and is implemented as a plug-in to the browser, and transcoding instructions are provided to the client device by way of the signature file(s) each time the plug-in is invoked. The client device uses the transcoding instructions to manipulate the secure response from the secure server, for example, to transcode the response to a format suitable for display on the client device.

15 Claims, 12 Drawing Sheets

OTHER PUBLICATIONS

Chang, Yuan-Chi et al.; Secure Transcoding of Internet Content; http://www.cs.colorado.edu/~rhan/IMMCN005.pdf; Hawthorne, New York, U.S.A.

Kitson, Fred; Mobile Media: Making it a Reality; Mobile Applications; vol. 3, No. 4—May 2005.

Lift Assistive User's Manual; Version 2.0 for Sun Solaris; www.usablenet.com; New York, U.S.A.

Knutsson, Bjorn et al.; Architecture and Performance of Server-Directed Transcoding; Acm Transactions on Internet Technology, vol. 3, No. 4, Nov. 2003, pp. 392-424; Pennsylvania U.S.A.

Usablenet Assistive User's Manual; 2004-2007 Usablenet Inc. New York, New York; http://text.rochester.edu/tt/user-help.html#protocols.

* cited by examiner

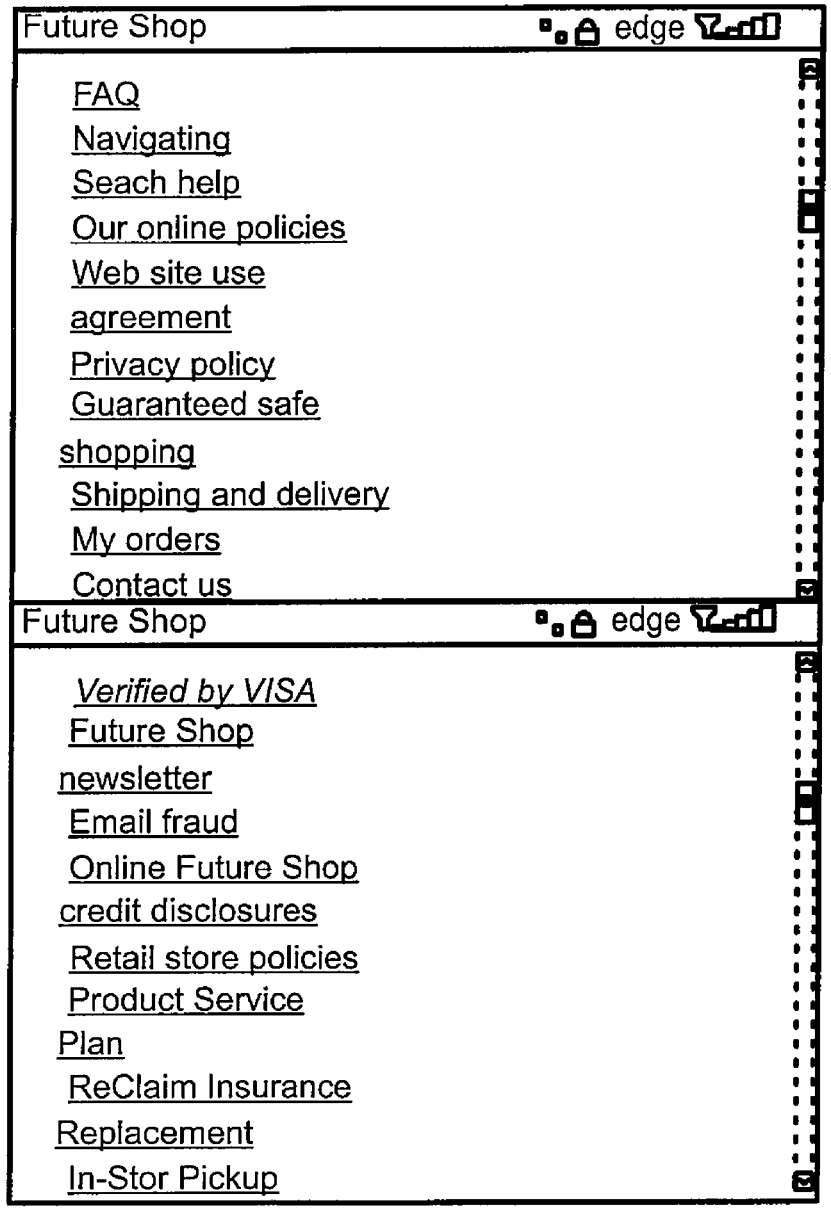
FIG. 7(iii)

SAMPLE MOBILE APPLICATION - CONTENT

SAMPLE MOBILE APPLICATION - MENU

METHOD AND APPARATUS FOR CHECKOUT TRANSITION IN AN E-COMMERCE APPLICATION

A portion of the disclosure of this patent document contains material which is subject to copyright protection. The copyright owner has no objection to the facsimile reproduction by any of the patent document or patent disclosure, as it appears in the Patent and Trademark Office patent file or records, but otherwise reserves all copyright rights.

FIELD OF THE APPLICATION

The present application relates to e-commerce, and more particularly, to a method and apparatus for checkout transition in an e-commerce transaction for a mobile communication device in a wireless packet data service network.

BACKGROUND OF THE APPLICATION

Websites pages can generally be separated into distinct functions—displaying content and navigation. Web pages typically have both of these functions on each page and will display content in the main content areas and have navigation options through menus. For example, web pages in e-commerce applications are typically designed for use PC based web browsers having 800×600 or higher screen resolutions. This layout makes sense for desktop browsers since the screens are large enough to display the entire page. However most mobile browsers do not have the width and height of a typical PC monitor, therefore they are unable to display pages as they would appear on a PC browser. One approach to deal with this is to re-organize the page and wrap content around the screen. A second approach often used by the WAP standard is spatially divide a page (usually vertically) into a number of pages and allow users to navigate between each page section to view a page. In a further example, large headers and menus force a user to scroll considerable lengths before reaching content specific to the web page being viewed. An exemplary e-commerce login page designed for a PC-based web browser is shown in FIG. 6 and using conventional techniques the webpage of FIG. 6 is rendered on the display of a mobile communication device in multiple screens as depicted in FIGS. 7(i) to 7(iv).

Accordingly, there remains a need for improvements in the art.

SUMMARY

The present application is directed generally to a method and apparatus for transcoding web pages, for example, content or webpage element(s), for a mobile communication device in a wireless packet data service network.

Other aspects and features will become apparent to those ordinarily skilled in the art upon review of the following description of embodiments in conjunction with the accompanying figures.

BRIEF DESCRIPTION OF THE DRAWINGS

Reference will now be made to the accompanying drawings which show, by way of example, embodiments of the methods and systems described herein, and how they may be carried into effect, and in which.

Like reference numerals indicate like or corresponding elements in the drawings.

DETAILED DESCRIPTION OF THE EMBODIMENTS

Embodiments of the present invention are generally directed to a method and system for transcoding web pages or web content for a mobile communication device.

According to one broad aspect, there is provided a method for generating a page suitable for display on a mobile communication device based on a webpage from a website server, the method comprises the steps of: requesting the webpage from the website server; establishing a communication link directly between the website server and the device; receiving at least a portion of the webpage over the communication link with the website server; obtaining one or more transcoding instructions; transcoding the received portion of the webpage according to the one or more transcoding instructions; and generating a page suitable for display on the mobile communication device based on the transcoded webpage.

According to another broad aspect, there is provided a mobile communication device configured for displaying a page generated from a webpage received from a website server over a communication network, the mobile communication device comprises, a component configured to request the webpage from the website server; a component configured to establish a communication channel directly between the website server and the device; a component configured to receive the webpage over the communication channel; a component configured to retrieve one or more transcoding instructions; a transcoding engine configured to execute the one or more transcoding instructions to transcode content in the received webpage; and a component configured to render a page suitable for display based on the transcoded content.

According to further broad aspect, there is provided a computer program product for generating a page suitable for display on a mobile communication device, the computer program product comprises, a storage medium configured to store computer readable instructions; the computer readable instructions include instructions for, requesting a webpage from a website server; establishing a communication link directly between the website server and the device; receiving at least a portion of the webpage over the communication link with the website server; obtaining one or more transcoding instructions; transcoding the received portion of the webpage according to the one or more transcoding instructions; and generating a page suitable for display on the mobile communication device based on the transcoded webpage.

According to a yet another broad aspect, there is provided a mechanism for changing the layout of a web page independently of the web server, and allowing the client to optimize the web page content and/or underlying user interface according to the requirements or characteristics of the client's device.

Figure 1:
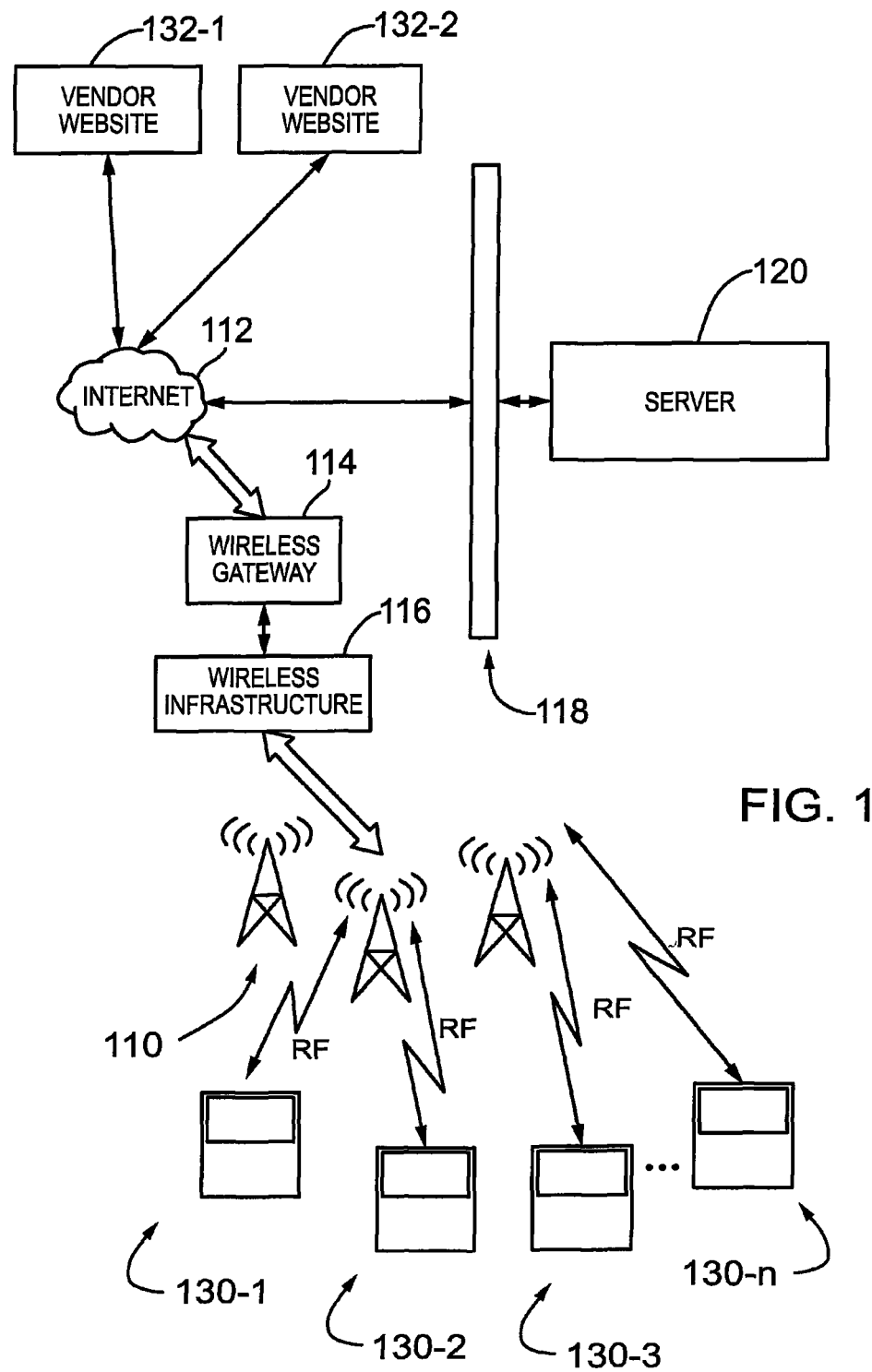
FIG. 1 shows in diagrammatic form an exemplary network environment suitable for operating an embodiment according to the present application.

Reference is first made to FIG. 1, which shows in diagrammatic form an exemplary network environment 100 wherein an embodiment as described herein may be practiced. The network environment 100 comprises a wireless network 110, the Internet 112, a wireless gateway 114, a wireless infrastructure 116, and a server 120. The wireless network 110 serves a plurality of users, each having a mobile communication device 130, indicated individually as 130-1, 130-2, . . . 130-n.

The wireless gateway 114 and the wireless infrastructure 116 provide a link between the Internet 112 and the wireless network 110. The wireless infrastructure 116 determines the most likely network for locating a given user and tracks the users as they roam between countries or networks. A message is then delivered to the mobile communication device 130 via wireless transmission, typically at a radio frequency (RF), from a base station in the wireless network 110 to the mobile device 130. The wireless network 110 may comprise any wireless network over which messages may be exchanged with a mobile communication device.

The wireless infrastructure 116 includes a series of connections to the wireless network 110. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Divisional Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric networks include the Mobitex™ Radio Network and the DataTAC™ Radio Network. Examples of older voice-centric data networks include Personal Communication Systems (PCS) networks like GSM, and TDMA systems.

The server 120 may be implemented, for example, on a network computer for a corporate entity, a computer within an ISP system or as part of a public server infrastructure. The server 120 provides an interface for web access on the Internet 112 for mobile communication devices 130 equipped with a browser or having browser capability as will be described in more detail below. An embodiment of the server 120 is described in more detail below. The server 120 may be implemented behind a firewall indicated by reference 118 in FIG. 1.

Figure 2:
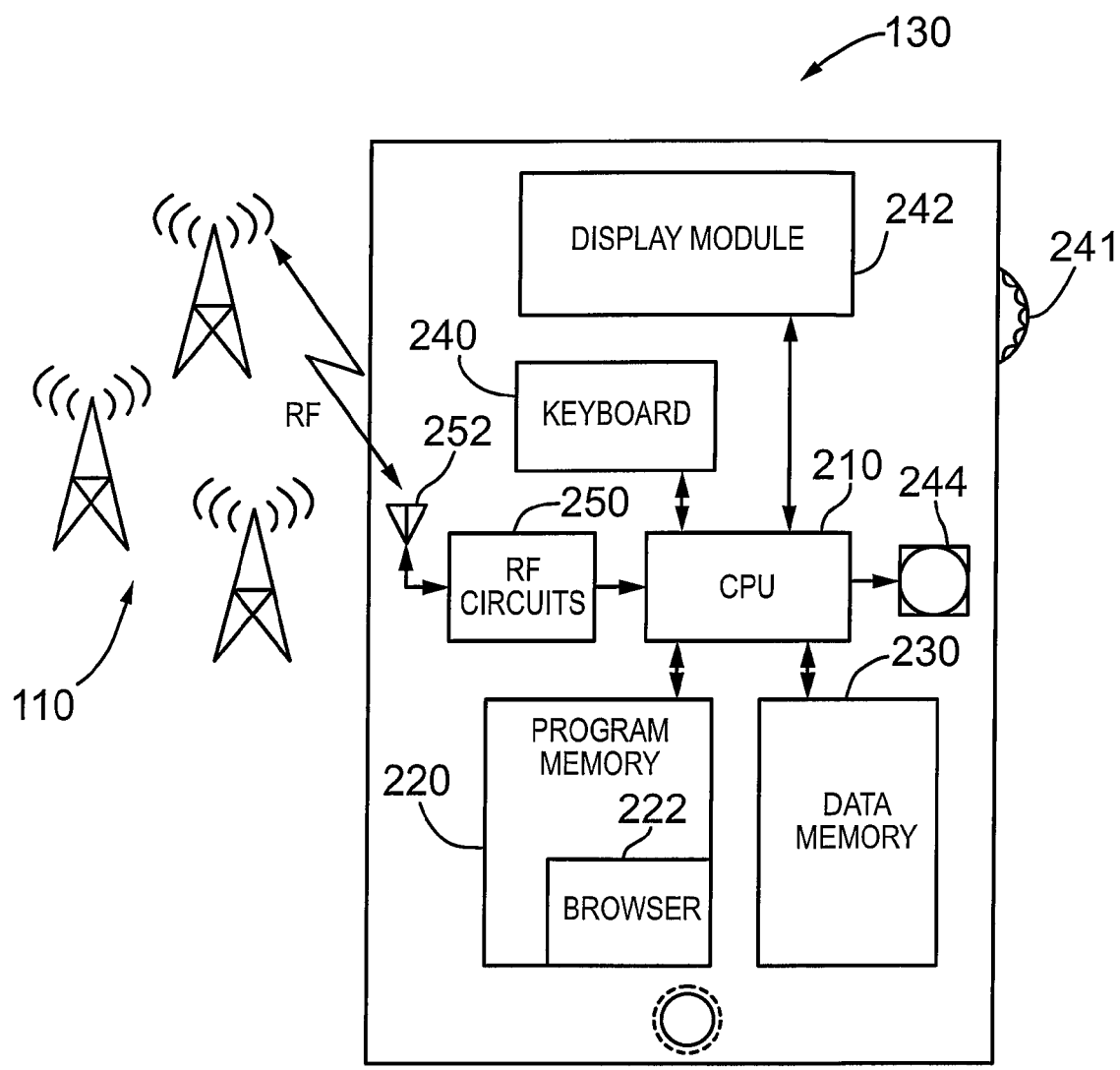
FIG. 2 shows in schematic form an exemplary mobile wireless communication device which is capable of communicating within the network environment of FIG. 1.

Reference is next made to FIG. 2, which shows in more detail an exemplary implementation of the mobile communication device 130. The mobile communication device 130 comprises a central processing unit or CPU 210. The CPU 210 operates under the control of a program (i.e. firmware or software) stored in program memory 220. The CPU 210 is also provided with data memory 230. The CPU 210 is also operatively coupled to a keyboard 240 and a track wheel 241 or a trackball 243 (shown in broken outline), a display module 242 and an audio transducer or speaker 244. In addition to the program executable code providing for performing the functions associated with the operation of the mobile communication device 130, the program memory 220 includes a browser program 222. The browser program 222 allows a user to access web pages (i.e. HTTP browsing) on the Internet 112 using the mobile communication device 130, i.e. utilizing a graphical user interface comprising, for example, the keyboard 240 and the display module 242 and/or the track wheel 241 (or the trackball 243). HTTP browsing comprises using HTTP (Hypertext Transfer Protocol) which comprises a request response protocol in which parameters a request are set before the request is sent. According to an embodiment, the mobile communication device 130 indicates another browser or browser module which is configured to transcode secure content, for example, from a secure HTTP (HTTPS) connection, as will be described in more detail below. The browser 322 may be implemented in the device 130 as a separate module or integrated with the browser program 222.

As shown, the mobile communication device 130 includes a RF, demodulation/modulation and decoding/coding circuits 250, and a suitable RF antenna 252. The RF demodulator/modulator and decoder/coder circuits 250 and the RF antenna 252 are operatively coupled to the CPU 210 and provide an interface for wireless communication with the wireless network 110. The particular implementation details of the RF circuits will be within the understanding of those skilled in the art, and is therefore not described in further detail.

To locate an e-commerce site, the user invokes the browser program 222 in the mobile communication device 130 and using the graphical user interface (i.e. the display 242, the keyboard 240 and/or a thumb-operated track wheel 241) enters the URL or a bookmark for a website of interest, for example, http://www.futureshop.ca. The browser 222 converts the user entry into a HTTP request and sends the request to the server 120. The server 120 relays the HTTP request to the web server, for example, web server 132-1 for "futureshop.ca". In response to the request, the web server 132-1 returns the requested or corresponding webpage to the mobile communications device 130. Similarly, if the user wishes to access another website, for example, http://www.bestbuy.ca, on web server 132-2, the HTTP request from the mobile communication device 130 is relayed by the server 120 to the web server 132-2. If the requested webpage comprises an HTTPS connection, then the browser 322 is invoked to transcode secure or encrypted content or elements as described in more detail below. According to an embodiment, HTTP requests are made using a HTTP connection and the transcoding browser 322 (FIG. 3) is invoked if an HTTPS request is encountered, where the HTTPS request initializes the transcoding engine 324 (FIG. 3) described in more detail below.

The originating client, for example, a web browser, is typically referred to as the "user agent". The destination server stores resources, such as, HTML files and images, and is typically referred to as the "origin server". In between the user agent and the origin server there may be several intermediaries, for example, proxies and gateways. In the context of the present application, the mobile handheld devices 130 comprise user agents, the server 120 comprises an intermediary server, and the web servers 132 comprise origin servers.

According to an embodiment, the intermediary server is located or configured behind a firewall.

Figure 3:
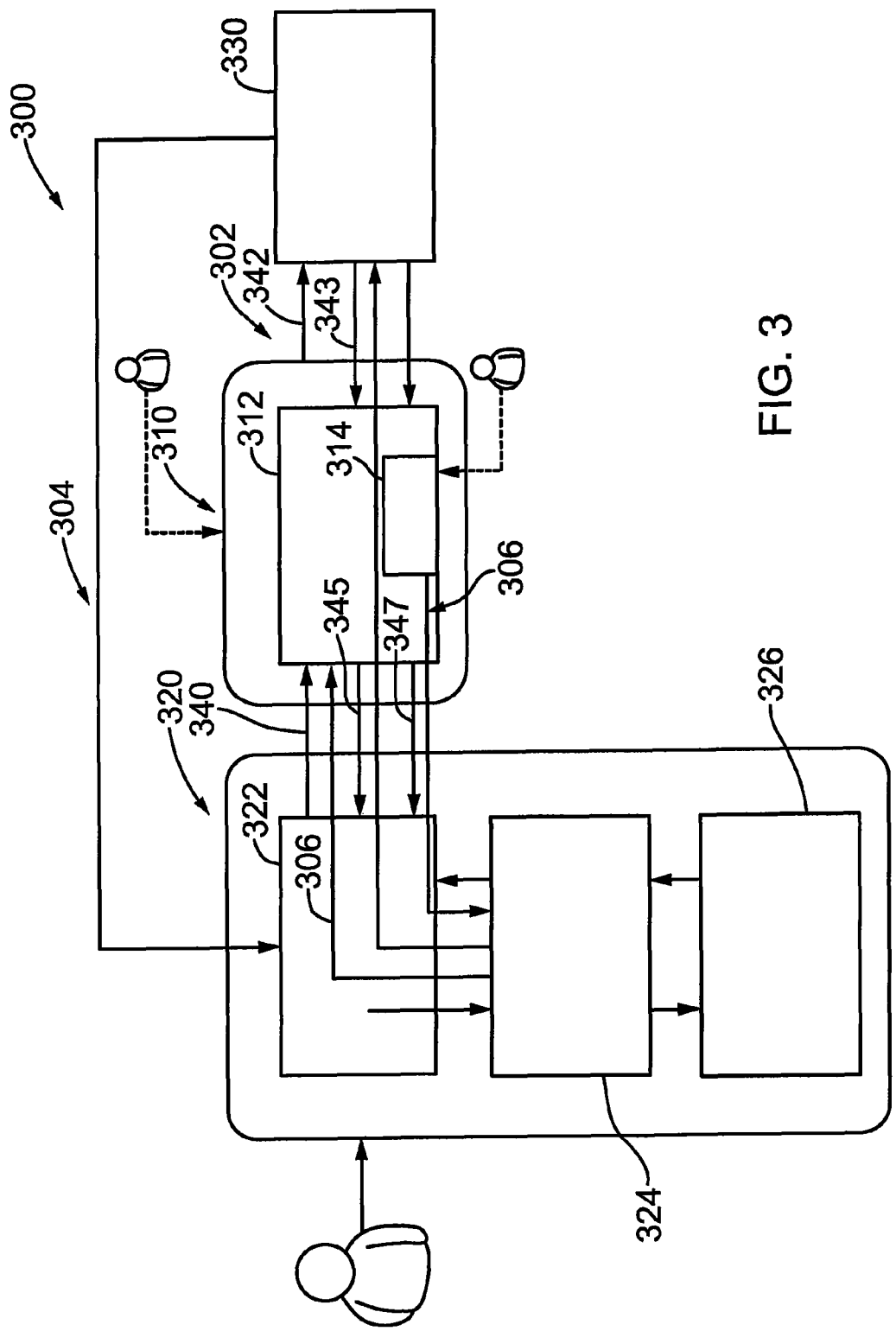
FIG. 3 shows in diagrammatic form a mobile communication device and server configuration according to an embodiment.

Reference is next made to FIG. 3, which shows in diagrammatic form a mobile communication device and server configuration according to an embodiment and indicated generally by reference 300. The system 300 as shown comprises a server 310 which is linked or communicates with a mobile handheld device 320. As will be described in more detail below, the server 310 may be integrated or associated with an intermediary server. According to another embodiment, the server 310 may be implemented as a stand-alone module or device. The server 310 couples the mobile handheld device 320 to a vendor website or e-commerce site indicated generally 330. According to an embodiment and as shown in FIG. 3, the mobile handheld device 320 includes a browser 322 and a transcoding engine 324. According to an embodiment, the transcoding engine 324 resides within the browser 322 and is layered just before the parsing/rendering of the HTML content. According to an embodiment, the transcoding engine 324 is initialized with transcoding instructions. According to an embodiment, the transcoding instructions are requested over a secure link, e.g. a secure HTTP connection or HTTPS, from the server 310 and remain on the mobile communication device 320, i.e. the client, for each subsequent secure request. According to an embodiment, the transcoding engine 324 has a lifespan that begins during the initialization process of receiving and processing transcoding instructions and ends when an end instruction is received or a page that has no instruction is encountered. According to another embodiment, the transcoding instructions are received from another source or stream, for example, installed on the device or read from a file stored in memory on the device.

According to an embodiment, the transcoding engine 324 is responsible for interpreting and executing the transcoding instructions, i.e. applying the transcoding instructions to content or webpage elements received from the website 330 as described in more detail below. The transcoding instructions may be static or dynamic, and identify content to be extracted, as well as defining the reorganization of the extracted content, for example, in a mobile friendly manner. Upon completion of the transcoding, the transcoding engine 324 creates a new input stream, which replaces the original content received over the secure socket from the vendor website 330, and the new input stream is passed to the browser 322, i.e. the rendering engine.

According to an embodiment, the content from the website 330 is treated in terms of pages and the pages may be organized or categorized in families. Each family of pages is identified by a signature, for example, in the form of a signature file. According to an embodiment, the signature file is stored on the server 310 and indicated generally by reference 314. According to an embodiment, the signature identifies a given page on a website as part of a family, and can also serve to differentiate that family from another family of pages. According to another aspect, object(s) and attribute field(s) can have a unique signature within a family of pages. The signature file comprises transcoding instructions, i.e. instructions for transcoding webpage content from the website 330 for rendering and display at the mobile communication device 320. According to one embodiment, the signature file comprises the following information or data:
- an identifier for the page family, for example, login, signup
- identifiers for objects and/or attributes in a page
- information specifying a relationship between objects and attributes, for example, a user login field is a global username field and a user password field is a global password field
- information defining a layout for presenting the relationship between the object(s) and attribute(s)

For mobile communication devices 320 that do not provide full support for JavaScript™ constructs, the signature file is implemented with transcoding instructions that mimic JavaScript™ calls, such as, submitting a form, setting variables, redirecting to another page, changing location of a frame or altering attributes of HTML tags.

Figure 5:
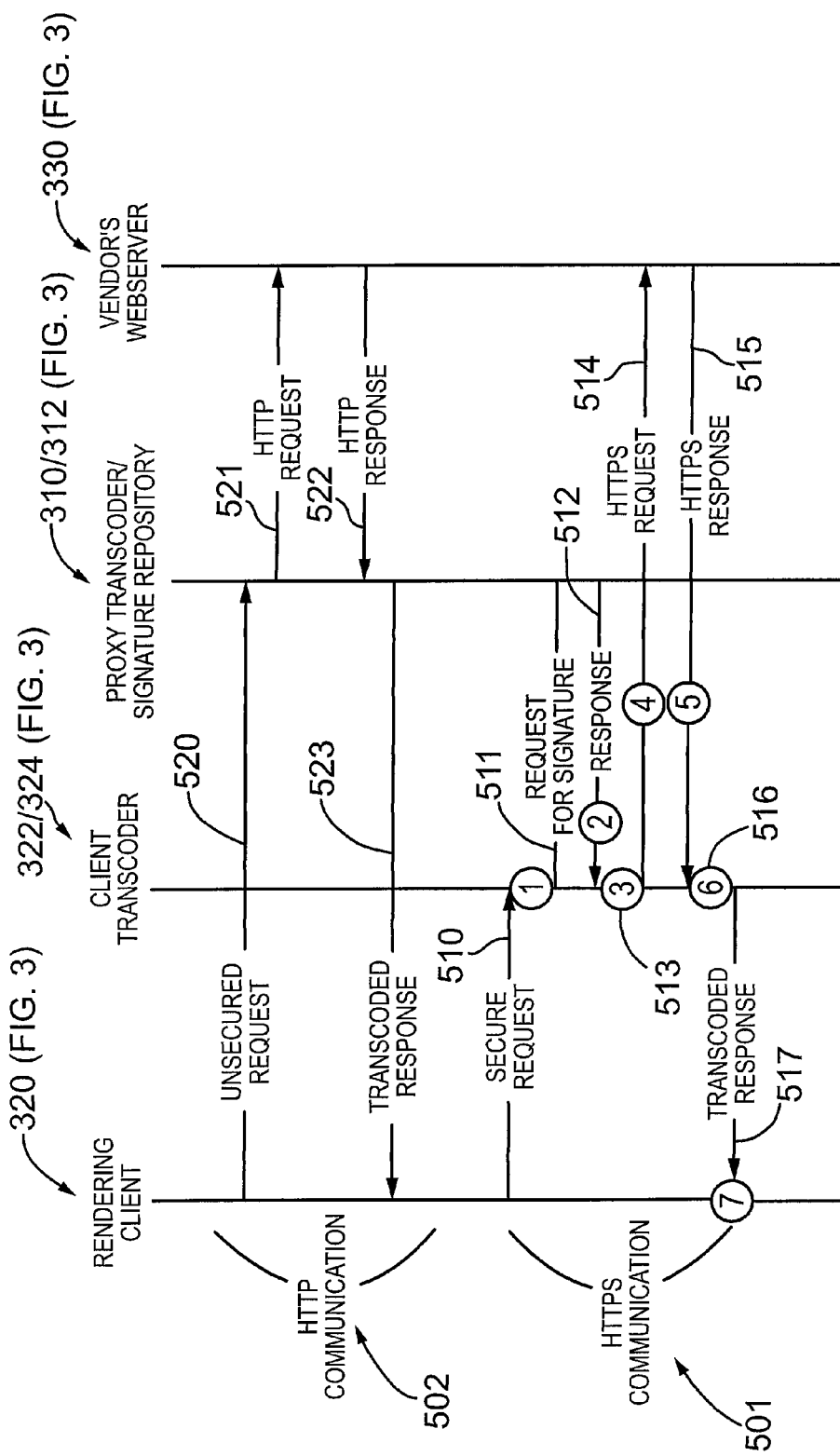
FIG. 5 shows in schematic form transcoder flow in relation to a client according to an embodiment.

The browser 322 provides the user interface (UI) for the mobile device 320 (i.e. the client). The browser 322 communicates with the vendor website 330 and other Web servers to fetch web pages, for example, using HyperText Transfer Protocol or HTTP. According to an embodiment and as shown in FIG. 3, a request, i.e. HTTP and HTTPS, is initially made using a standard HTTP connection, for example, as indicated by reference 302 in FIG. 3 and reference 502 in FIG. 5. The browser 322 is implemented to browse (e.g. receive) web pages with unencrypted content from the website 330 utilizing an HTTP connection reference 302 via the server 310. The server 310 may be configured to transcode or convert the unencrypted (e.g. HTTP) responses received from the website 330 into a format suitable for display on the device. According to an embodiment, a communication channel or connection indicated by reference 304 in FIG. 3 and reference 501 in FIG. 5, is utilized if the transcoding engine 324 has been initialized. The transcoding engine 324 may be initialized, for example, if a signature file is downloaded. According to an embodiment, the communication channel 304 comprises a direct or end-to-end connection and may according to an embodiment further comprise a secure communication channel or connection, such as, an HTTPS connection. According to an embodiment, the HTTPS connection 304 is configured to permit transcoding of SSL/TLS without violating end-to-end security. For example, the HTTPS connection is configured to provide: (a) the capability to read the connection before passing it to the rendering component; (b) the capability to alter the contents of the connection.

Referring still to FIG. 3, the HTTP connection 302 comprises an unsecure or open communication path. For example, the browser 322 generates a page request 340 which is received by the server 310 and transmitted in a page request 342 to the website 330. The server 310 receives a response page 343 from the website 330, which is then transmitted to the browser 322 as a response page 345. The browser 322 may also be implemented to receive cookies 347 from the website 330 via the server 310. As shown, the server 310 includes an engine 312. The engine 312 is configured to manage the signature files 314, i.e. as described above and in more detail below. According to embodiment, the browser 322 may comprise a more generic browser implementation, and can be implemented as a component or module of the browser program 222 (FIG. 2).

The server 310 hosts or stores signature file(s) 314, and the signature file(s) 314 comprise transcoding instructions, which are used by the transcoding engine 324 on the mobile communication devices 320 to transcode web pages or content received from the website on the direct end-to-end or secure communication path 304, as described in more detail below. According to an embodiment, the communication path 304 comprises a secure HTTP connection or HTTPS, and the transcoding engine 324 utilizes an XML (Extensible Markup Language) library to read the signature file(s) 314. The signature file(s) 314 are transmitted to the mobile communication device 310 via another communication path or channel indicated by reference 306. According to an embodiment, the communication path 306 comprises a Secure Sockets Layer (SSL) protocol or a Transport Layer Security protocol (TLS) for data transfer.

Figure 4:
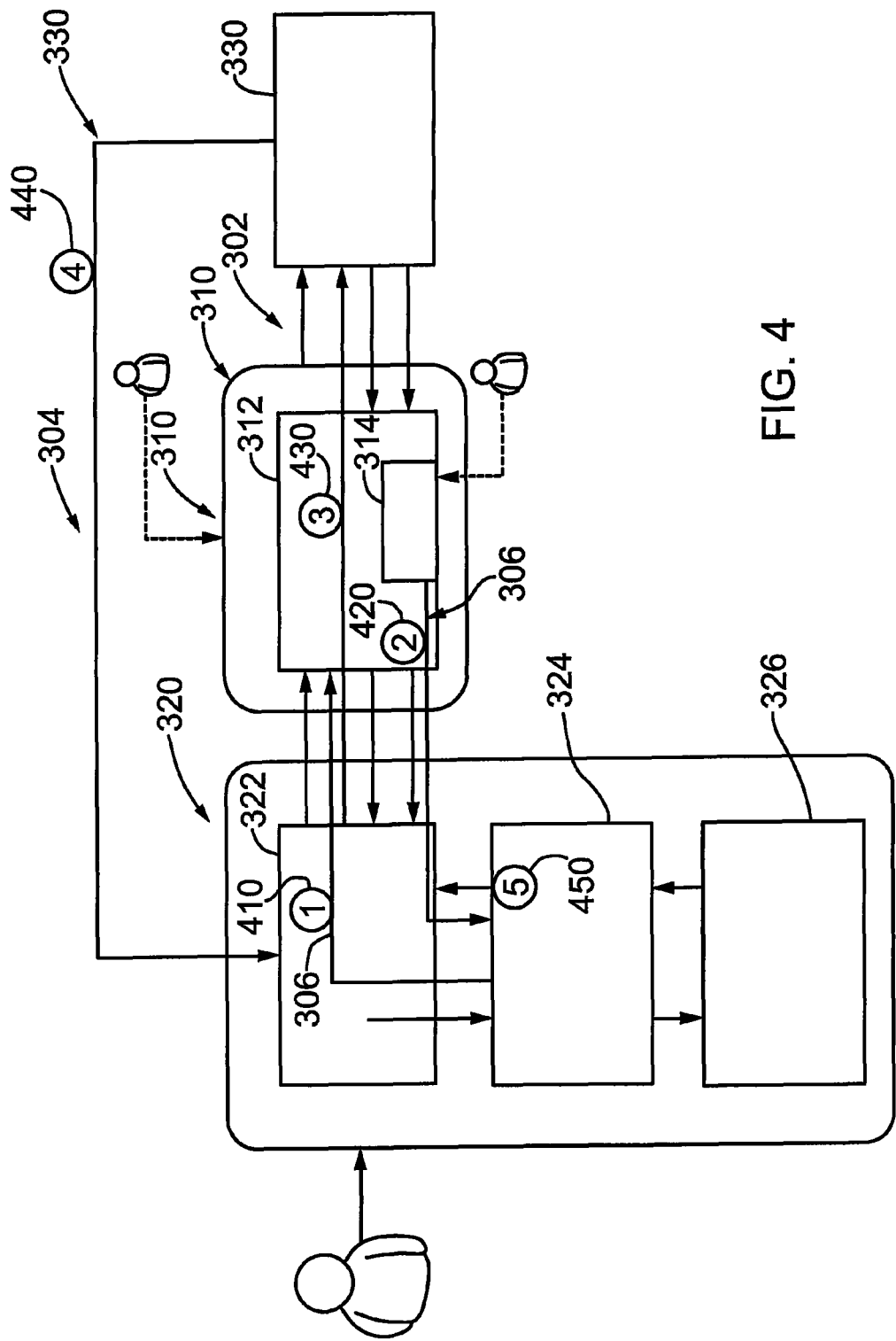
FIG. 4 shows in diagrammatic form the mobile communication device and server configuration of FIG. 3 with transcoder flow according to an embodiment.

Reference is next made to FIG. 4, which shows an example of transcoder data and website content flow for the configuration of FIG. 3. For the example in FIG. 4, the vendor website 330 comprises "FutureShop.ca". The first step indicated by reference 410 comprises the transcoding engine 324 making a request to the server 310 for the signature file 314 for FutureShop.ca. The request is made over a secure communication path 306 via the browser 322 (FIG. 3). The request may be initiated for example in response to the user requesting secure or encrypted content at the mobile device 320, for example, the login page at the FutureShop.ca website. The server 310 validates the request and returns the signature file in a response indicated by reference 420. According to an embodiment, a certificate authority may be utilized to validate the request. The certificate authority (CA) verifies the user's credentials, for example, using a public-private key pair mechanism. According to an embodiment, the response may also include an initial target, i.e. the HTTPS page on the FutureShop website 330. The transcoding engine 324 receives the signature file 314 via the browser 322 and loads the file 314 into memory on the mobile device 320. A request is made for the FutureShop webpage over the secure communication channel (e.g. HTTPS) 304, as indicated by reference 430. The vendor website 330 (i.e. FutureShop.ca) transmits a secure encrypted response page or content (i.e. via the HTTPS communication path 304) to the transcoding engine 324 via the browser 322, as indicated by reference 440. The transcoding engine 324 receives the secure response webpage and applies the transcoding instructions contained in the signature file 314 to transcode the webpage and render a transcoded page for the browser 322 as indicated by reference 450. For example, the response page received from the vendor website 330 may comprise an e-commerce login page 600 as depicted in the screenshot shown in FIG. 6, and the page rendered by the transcoding engine 324 for the browser may comprise a login page 800 as depicted in the screenshot shown in FIG. 8.

Figure 8:
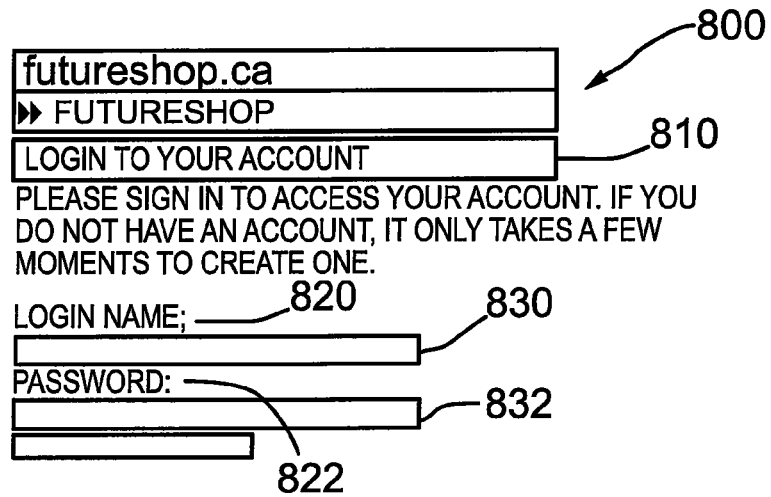
FIG. 8 shows a screen shot of an exemplary e-commerce login page with transcoding according to an embodiment.
Figure 6:
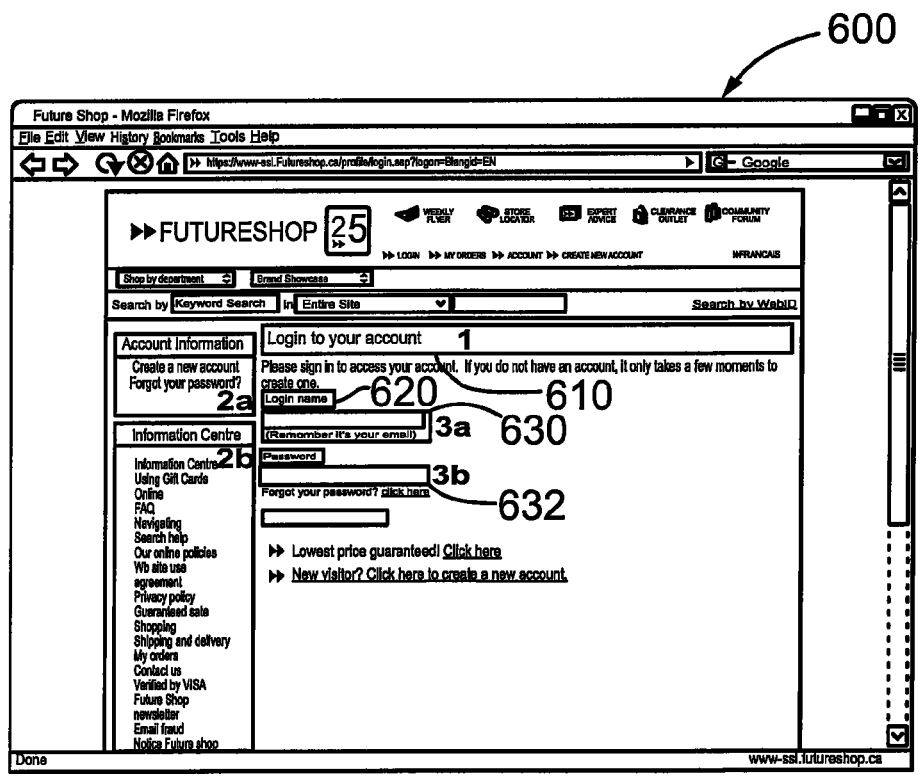
FIG. 6 shows a screen shot of an exemplary login webpage for an e-commerce or vendor website designed for a personal computer (PC) display monitor.
Figure 7I:
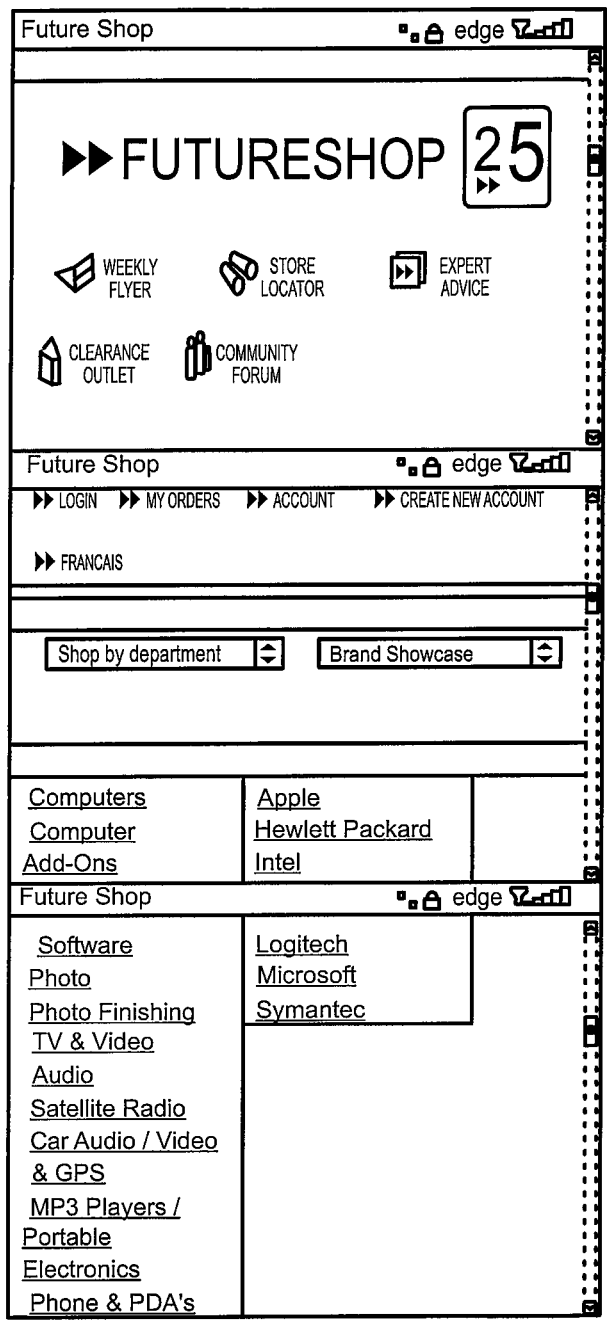
FIGS. 7(i) to 7(iv) shows screen shots of the exemplary login webpage for an e-commerce or vendor website of FIG. 6 rendered on the display module of the mobile communication device of FIG. 2.
Figure 7:
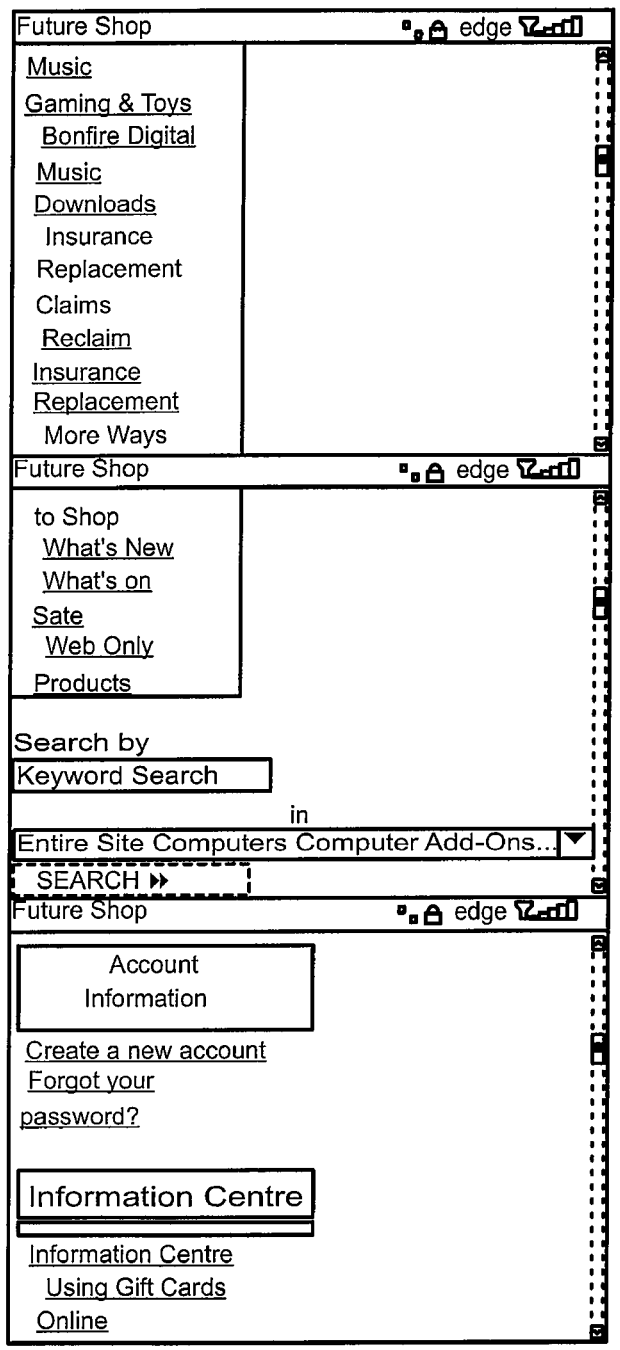
Figure 7:
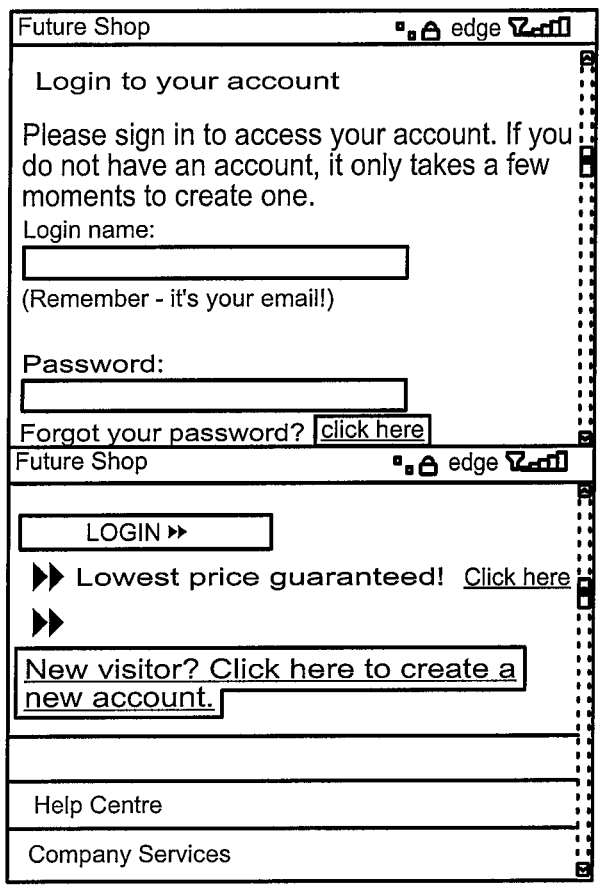

Reference is next made to FIG. 5, which shows in further detail operation of the server and mobile device configuration 300 of FIG. 3, according to an embodiment. The server and mobile device configuration 300 provides a secure communication mechanism indicated by reference 501 and an unsecured or open communication mechanism indicated by reference 502. As shown, a first step indicated by reference 510 in a secure communication 501 (i.e. a HTTPS communication) comprises the client (i.e. user agent) making a request for a webpage having secure or encrypted content. According to an embodiment, the initial request is made via an HTTP connection. In response to the request for a secure webpage (or content), a request for a signature file is initiated. The server 310 receives the request for a signature file 314 associated with the secure webpage and containing transcoding instructions, as indicated by reference 511. In response to the client request, the server 310 generates an HTTP response with the location of the secure content set in the HTTP header and the HTTP content being the transcoding instructions in XML format, as indicated by reference 512. The browser 322 running on the mobile device 320 initiates the secure transcoder 324 with the signature file 314 indicated by reference 513. The browser 322 then requests the secure content (end-to-end) from the web server, i.e. the vendor website 330, as indicated by reference 514. The browser 322 receives the secure content (e.g. an e-commerce login page 600 as depicted in FIG. 6) from the web server 330, decrypts the content and then invokes the transcoder engine 324, as indicated by reference 515. The transcoding engine 324 applies the code (i.e. XML code) in the signature file 314 as instructions to extract the desired data from the web page, as indicated at 516. According to another aspect, the signature file 314 can include instructions to re-construct the content in a mobile friendly view. The transcoding engine replaces the original decrypted content or webpage with the transcoded content, which is then passed to an HTML renderer in the browser 322, as indicated by reference 517. For example, FIG. 8 shows an exemplary "login page" generated in accordance with an embodiment of the transcoding engine 324, as will be described in more detail below.

Reference is again made to FIG. 5, and the operation of an unsecure transmission 502 according to an embodiment. The client (i.e. user agent) 320 makes a request to the vendor website 330, as indicated by reference 520. The request is transmitted (or relayed) by the engine 312 on the server 310 as an HTTP request to the vendor website 330, as indicated by reference 521. According to an embodiment, the engine 312 is configured to operate as a transcoder and transcodes the request received from the client 320 into an HTTP request. The vendor website 330 receives the HTTP request and transmits an HTTP response to the server 310, as indicated by reference 522. According to an embodiment, the engine 312 is configured to transcode and transmit the HTTP response to the client 320, as indicated by reference 523. For example, the engine 312 may be configured for compressing, optimizing and/or transcoding the webpage or information from the transcoding server 310 before transmission to the mobile communication device 320. The compression component compresses the website data for viewing on a small screen, such as the display 242 (FIG. 2) in the mobile communication device 320. The compression component may also provide image compression for optimizing images in the webpage downloaded to the mobile communications devices 320. It will be appreciated that compression provides better utilization of the bandwidth between the server 310 and the mobile communication devices 320.

Referring back to FIG. 3, the signature file 314 according to an embodiment is described in more detail with reference to the following exemplary implementations in XML. The first code snippet shown below shows a page family signature for the exemplary vendor website, FutureShop.ca.

```
1    <page_type>
2        <lookup type="pex" action="locate_string" name="form_elements" id="login" ref="Login to your account" />
3        <lookup type="pex" action="locate_string" name="form_elements" id="checkout" ref="Checkout" />
4        <lookup type="pex" action="locate_string" name="form_elements" id="signup" ref="Create a new account" />
5    </page_type>
```

The transcoding engine 324 (FIG. 3) is configured to process the  tag (Line 1) by registering an identification string for each page family. When a webpage is received, the engine 324 uses the identification string to identify a page family. The command action="locate_string" is used to check for the existence of a string. The command name="" is used to identify the type of page family for each identified family and the command id="" is used to assign an "id" to the page family. The assigned "id" is then used across the signature file.

In operation according to an embodiment, the first step when the engine 324 is passed a web page and the signature file 314, is to identify the page type. The engine 324 then utilizes the page type to determine the corresponding form_elements tag associated with the page family. The form family signature according to an embodiment may be implemented as illustrated by in the following code snippet:

```
1    <form_elements>
2        <container id="login"/>
3        <settings>
4            <layout4 type="line" i1="user.f" />
5            <layout5 type="line" i1="user.i" f1="wf1" />
6            <layout6 type="line" i1="pass.f" />
7            <layout7 type="line" i1="pass.i" f1="wf2" />
8
9            <wf1 wallet="login" f1="user" />
10           <wf2 wallet="login" f1="pass" />
11       </settings>
12       <element>
13           <lookup type="pex" action="get_string"
name="user.f" ref="end Information Centre" ref1="tx-strong-dgrey"
location="after" start="&gt;" end="&lt;" />
14           <lookup type="pex" action="get_string"
name="pass.i" ref="end Information Centre" ref1="name=&quot;
fs_password&quot;" location="middle" start="&lt;" end="&gt;"
include_sz="1"/>
15       </element>
16   </form_elements>
```

Once the transcoding engine 324 has identified that the page belongs to the "mylist_1" family, the transcoding engine 324 looks for spots in the signature file that contain the signatures for the objects and elements of the family. The <container id=""> tag contains the reference identifier for the current form element, in this example, the identifier is "login" (Line 2). The <settings> tags define any page specific manual overrides, for example, the exclusion of certain menu items, or the customization or modification of a menu. The <elements> tags define the instructions to be executed by the transcoding engine 324 for transcoding the webpage and/or page content. For example, the instruction at Line 28 instructs the transcoding engine 324 to look for a reference of the string "tx-strong-dgrey", then locate the value between the start and end strings specified to the right of reference point. The element, which is a label for a form element, is after the reference string and its value is to be extracted and returned.

The following is an example of the operation of the transcoding engine 324 according to an embodiment once a webpage from FutureShop.ca has been received by the transcoding engine 324 (FIG. 3) and the signature file 314 (FIG. 3) downloaded from the server 310 (FIG. 3), for example, step 516 in FIG. 5:

the transcoding engine confirms that the webpage (i.e. HTML input) is from FutureShop.ca (i.e. the vendor website) and that the signature file also corresponds to FutureShop.ca; for example, the transcoding engine 324 checks the url location="" tag in the HTML file the transcoding engine sets a global variable; for example, the transcoding engine 324 sets the base URL to "https://www-ss1.futureshop.ca", and the checkout index to "https://www-ss.futureshop.ca/checkout/step1.asp?logon=L&langid=EN#est"

the transcoding engine determines the page type by checking for the existence of string identifiers for each page family; for example, the transcoding engine 324 looks for and finds the string "Login to your account" and identifies the page as a login page the transcoding engine then moves to the form_elements section of the signature file which contains the instructions for extracting the login object elements from the webpage; for example, the transcoding engine 324 extracts a login form object for the login page 600 depicted in FIG. 6; the login form object comprises the following elements: a form label 610, a field label for the login name 620, a field label for the password 622, an input field for the login name 630, and an input field for the password 632; according to an embodiment, the transcoding engine 324 extracts and returns the string and any associated HTML parameters for each of the elements comprising the form object the transcoding engine then assembles the extracted strings into a page for display on the mobile communication device; for example, the transcoding engine 324 constructs a login page 800 as depicted in FIG. 8 from the strings and associated HTML parameters extracted from the webpage 600 in FIG. 6. As shown in FIG. 6, the login page 800 includes a corresponding form label 810, a login name field label 820, a password field label 822, a login name input field 830 and a password input field 832.

Referring back to FIG. 3, the mobile communication device 320 may also include a wallet according to an embodiment. The wallet denoted by reference 326 provides a mechanism for storing or saving information such as account credentials, personal user information, credit card information, and the like. According to an embodiment, the wallet 326 comprises a secure storage mechanism and information entered by the user is encrypted. The data stored in the wallet 326 is accessible for future transactions thereby eliminating the need for the user to repeatedly enter information. According to another aspect, the wallet 326 includes a user interface (UI) with user authentication for retrieving information, such as a credit card, from the wallet 326.

According to a further aspect, the transcoding mechanism can include an entry point to the wallet 326. According to an embodiment, the entry point comprises transcoding instructions, for example, in the signature file, that comprise mapping(s) to the wallet 326. If the mapping(s) are provided, then the wallet 326 is made available. According to an embodiment, the transcoding instructions comprise mappings between HTML fields and the wallet. The following exemplary code section or snippet in the signature file comprises mappings to the wallet 326 which are used to populate HTML fields in the transcoded webpage.

```
1 <form_elements id="myform_2">
2     <settings>
3         <layout1 i1="firstname" f1="wf1" />
4         <layout2 i1="address" f1="wf2" />
5             <wf1 wallet="user" f1="fname" />
6             <wf2 wallet="user" f1="streetnum" t2="
                 "f3="streetname" />
7     </settings>
8     <element>
9         <lookup name="firstname" .../>
10        <lookup name="address" .../>
11    </element>
12 </form_elements>
```

The transcoding instruction for "firstname" (Line 3) maps the firstname field to the wallet field "wf1". The wallet field wf1 (Line 5) is defined as a card type for the user and comprises the field "fname". The transcoding instruction for "address" (Line 4) maps the address field to the wallet field "wf2". The wallet field wf2 (Line 6) is defined as a card type for the user and comprises the fields "streetnum" and "streetname".

As described above, the transcoding engine 324 provides the capability for transcoding capabilities during a secure end-to-end connection between a client device and a website without the use of a proxy or intermediate server. By eliminating the use or need for a proxy, the potential for unauthorized access to secure sensitive information, for example, financial data, user specific details and/or confidential information, is reduced. According to an embodiment, the transcoding engine resides on the client, and is implemented as a plug-in to the browser. The transcoding instructions are downloaded to the client by way of the signature file(s) each time the plug-in is invoked. The client uses the transcoding instructions to manipulate the secure response from the secure server, for example, to transcode the response to a format readable by the user device. According to an embodiment, the instructions can be domain specific and can identify and/or map fields from the secure content to a single generic field, for example, input box on web server A=input box on web server B=generic field for first name.

Figure 9:
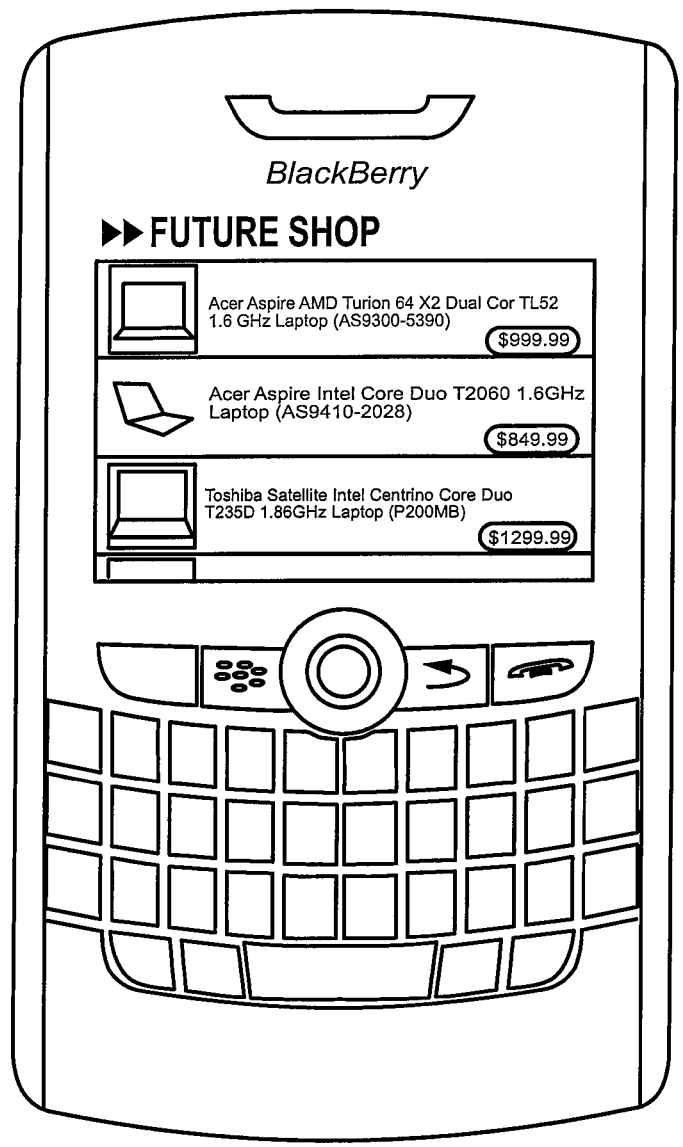
FIG. 9 shows a screen shot of an application rendered on the display module of a mobile communication device.
Figure 10:
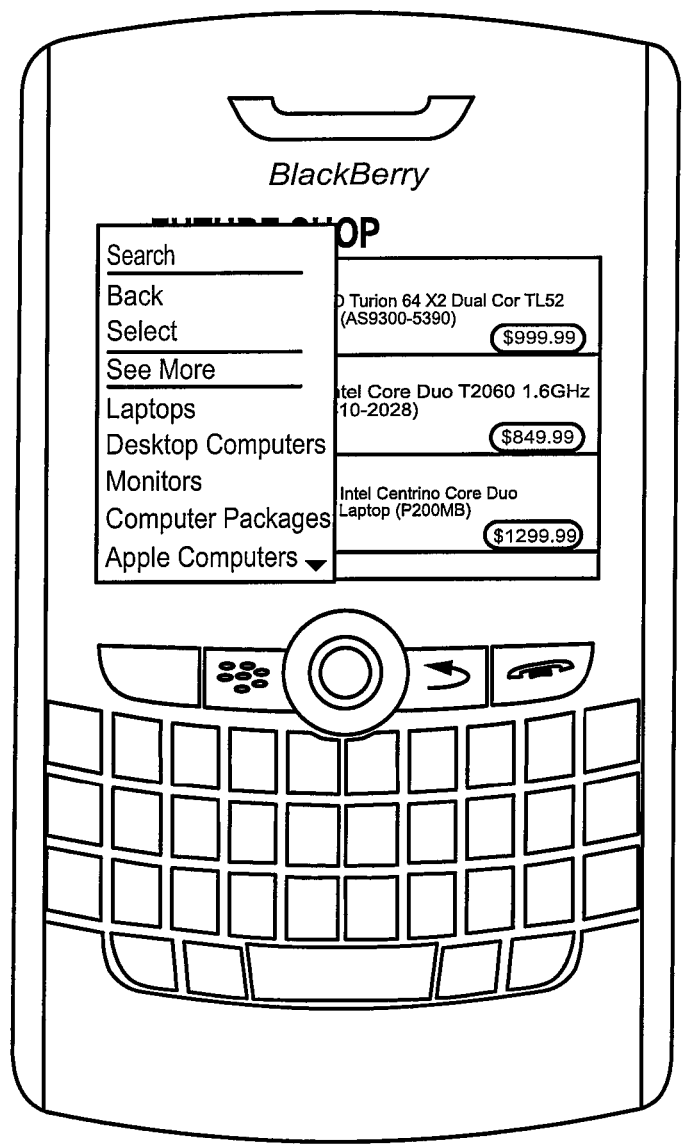
FIG. 10 shows a screen shot of the application of FIG. 9 with a menu rendered on the display module of a mobile communication device.

FIGS. 9 and 10 show an exemplary e-commerce webpage rendered on a mobile communication device in accordance with an embodiment of the transcoding mechanism. FIG. 10 shows the webpage of FIG. 9 rendered with a menu.

The functionality and features associated with the mobile communication device and/or the server as described above in accordance with the embodiments may be implemented in the form of one or more software objects, modules, components, or computer programs or program modules in the mobile communication device and/or server. Further, at least some or all of the software objects can be hard-coded into central processing units and/or read only memories or other non-volatile storage media in the mobile communication device, server and/or other components or modules depicted in the drawings. The specific implementation details of the software objects and/or program modules will be within the knowledge and understanding of one skilled in the art.

While the embodiments according to the present application have been described in the context of mobile communication devices, the embodiments may be extended or find application in other client-server configurations.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for generating a page suitable for display on a mobile communication device based on a webpage from a website server, said method comprising the steps of:
   requesting the webpage from the website server, wherein said website server includes website content comprising webpages organized into two or more page families;
   establishing a communication link directly between the website server and the mobile communication device;
   receiving at least a portion of the webpage over said communication link with said website server;
   obtaining a signature file comprising one or more transcoding instructions over said communication link with said website server, wherein a transcoding engine determines a page type of the webpage by checking said signature file for string identifiers of each page family;
   transcoding said received portion of the webpage at the mobile communication device according to said one or more transcoding instructions associated with the page family;
   mapping data stored locally at the mobile communication device to one or more fields in the webpage according to said one or more transcoding instructions; and
   generating a page suitable for display on the mobile communication device based on said transcoded portion of the webpage.

2. The method as claimed in claim 1, wherein said direct communication link comprises a secure communication channel between said website server and the mobile communication device.

3. The method as claimed in claim 1, wherein said page family comprises an e-commerce application.

4. The method as claimed in claim 1, wherein said direct communication link comprises an HTTPS connection between the website server and the mobile communication device.

5. The method as claimed in claim 1, wherein said step of establishing a communication link and downloading said one or more transcoding instructions is initiated in response to said step of requesting a webpage.

6. The method as claimed in claim 1, wherein said step of obtaining said one or more transcoding instructions comprises installing a file on the mobile communication device.

7. The method as claimed in claim 1, further comprising obtaining a signature for an object or attribute field within a page family.

8. A mobile communication device configured for generating a page suitable for display on the mobile communication device based on a webpage received from a website server over a communication network, said mobile communication device comprising:
   a component configured to request the webpage from the website server, wherein the website server includes website content comprising webpages organized into two or more page families;
   a component configured to establish a communication link directly between the website server and the mobile communication device;
   a component configured to receive at least a portion of said webpage over said communication link with said website server;
   a component configured to obtain a signature file comprising one or more transcoding instructions, wherein a transcoding engine determines a page type of the webpage by checking said signature file for string identifiers of each page family;
   a component configured to transcode said received portion of the webpage at the mobile communication device according to said one or more transcoding instructions, said component configured to transcode including a mapping component configured to map data stored locally at the mobile communication device to one or more fields in the web page according to said one or more transcoding instructions; and
   a component configured to generate a page suitable for display on the mobile communication device based on said transcoded portion of the webpage.

9. The mobile communication device as claimed in claim 8, wherein said locally stored data includes one or more of client name, client password, client address, client preferences, credit card information and payment account.

10. The mobile communication device as claimed in claim 8, wherein said direct communication link comprises a secure communication channel between said website server and the mobile communication device.

11. The mobile communication device as claimed in claim 8, wherein said page family comprises an e-commerce application.

12. The mobile communication device as claimed in claim 8, wherein said direct communication link comprises an HTTPS connection between the website server and the mobile communication device.

13. The mobile communication device as claimed in claim 8, wherein said component configured to establish a communication link is initiated in response to requesting a webpage by said component configured to request the webpage from the website server.

14. The mobile communication device as claimed in claim 8, wherein said component configured to obtain said one or more transcoding instructions comprises means for installing a file on the mobile communication device.

15. A computer program product for generating a page suitable for display on a mobile communication device, said computer program product comprising:
  a non-transitory computer readable storage medium configured to store computer readable instructions;
  said computer readable instructions including instructions for,
  requesting a webpage from a website server, said website server including website content comprising webpages organized into two or more page families;
  establishing a communication link directly between the website server and the mobile communication device;
  receiving at least a portion of the webpage over said communication link with said website server;
  obtaining a signature file comprising one or more transcoding instructions, wherein a transcoding engine determines a page type of the webpage by checking said signature file for string identifiers of each page family;
  transcoding said received portion of the webpage at the mobile communication device according to said one or more transcoding instructions;
  mapping data stored locally at the mobile communication device to one or more fields in the webpage according to said one or more transcoding instructions; and
  generating a page suitable for display on the mobile communication device based on said transcoded portion of the webpage.

* * * * *